United States Patent [19]
Woodruff

[11] 4,376,614
[45] Mar. 15, 1983

[54] PROPELLER BRAKE FOR A TURBO-PROP ENGINE
[75] Inventor: Frank Woodruff, New Hartford, N.Y.
[73] Assignee: The Bendix Corporation, Southfield, Mich.
[21] Appl. No.: 191,730
[22] Filed: Sep. 29, 1980
[51] Int. Cl.³ .......................................... F01D 21/14
[52] U.S. Cl. ................................ 416/32; 416/169 R; 415/18; 415/61; 415/123; 188/71.1; 192/114 R; 60/39.163
[58] Field of Search ......................... 416/32, 169, 188; 188/69, 71.1, 31, 73.2; 192/114 R, 46, 85 A; 244/65, 60, 7 A, 7 R; 180/301; 415/61, 18, 123; 60/39.16 S, 39.14 R

[56] References Cited
U.S. PATENT DOCUMENTS 2,141,091 12/1938 Quick ...................................... 244/65
2,737,018 3/1956 Bain ...................................... 60/39.14
2,981,063 4/1961 Wickman ........................ 60/39.16 S
3,225,876 12/1965 Dison .................................... 192/46
3,899,877 8/1975 Flanigan et al. ............... 60/39.16 S

FOREIGN PATENT DOCUMENTS

167457 4/1956 Australia ............................... 415/18

Primary Examiner—Harvey C. Hornsby
Assistant Examiner—Brian J. Bowman
Attorney, Agent, or Firm—James R. Ignatowski; Russel C. Wells

[57] ABSTRACT

A propeller brake for a twin spool turbo-prop engine which permits the propeller to be locked in a stationary position with the engine running is disclosed. The propeller brake has a hydraulically actuated friction brake and hydraulically actuated locking mechanism rotatably connected to the engine spool turning the propeller. The friction brake stops the propeller from rotating in response to an external command. A hydraulic signal indicating the propeller has stopped rotating actuates the mechanical lock holding the propeller in a stationary position. A safety latch prevents the mechanical lock from being actuated in event of a hydraulic pressure or engine failure in flight.

26 Claims, 4 Drawing Figures

FROM PROPELLER ACTUATING OIL PUMP

FROM ENGINE LUBRICATING OIL PUMP

FIG. 4

FROM PROPELLER ACTUATING OIL PUMP

FROM ENGINE LUBRICATING OIL PUMP

PROPELLER BRAKE FOR A TURBO-PROP ENGINE

BACKGROUND OF THE INVENTION

1. Field of the Invention

The invention is related to turbo-prop engines and in particular to a propeller brake for a twin-spool turbo prop engine.

2. Prior Art

Propeller brakes for conventional piston engines and turbo-prop engines are known in the art. These brakes however are designed to stop the rotation of the propeller in the event of an engine failure, first to reduce the aerodynamic drag of the windmilling propeller in flight, and secondly to prevent further damage to the engine by the continued rotation of the propeller. Quick in U.S. Pat. No. 2,141,091 discloses a friction brake for the propeller of a piston engine. Bain in U.S. Pat. No. 2,737,018 discloses a friction brake for a turbo-prop engine which is actuated in response to a reduction in the oil pressure in either the engine or reduction gearing assembly when the engine is shut down. The brake is released by air pressure when the engine is being started. Alternatively, Dison in U.S. Pat. No. 3,225,876 discloses a propeller coupling for a turbo-prop engine which disengages the propeller from the turbine engine whenever the rotational speed of the propeller exceeds the speed of the engine by a predetermined amount.

It is often desirable to stop the rotation of the propeller of a turbo-prop engine for other reasons, in addition to stopping the rotation of the propeller in the event of an engine failure.

Presently it is required to stop the engine of a commercial turbo-prop powered aircraft when passengers are boarding or leaving the plane. The thermo cycling of the engine occasioned by the frequent starting and stopping of the engine at each stop appreciably reduces the life of the engine. The stopping of the engine further requires the use of an auxilliary power unit to provide the essential electrical and hydraulic services to the aircraft during the period when the engine or engines are shut down.

From an efficiency point of view, it is desirable keep the engines running while the passengers are boarding or leaving the plane. However the rotating propellers are highly dangerous to unwary passengers and crew members in the immediate vicinity of the aircraft. Additionally, even in their feathered state, the whirling propellers produce objectionable wind gusts.

The disclosed invention is a propeller brake which is a solution to this problem.

DESCRIPTION OF THE INVENTION

The invention is a propeller brake for a twin spool turbo-prop engine which permits the propeller to be stopped and locked in the stopped position without requiring the engine to be stopped. The brake comprises a hydraulically actuated friction brake, and a hydraulically actuated mechanical lock linked to the engine spool driving the propeller. The friction brake, in response to a command to stop the propeller, brings the propeller to stationary position. When the propeller stops rotating a second signal is generated which actuates the mechanical lock to physically lock the propeller in its stopped position. A safety lock prevents inadvertant actuation of the mechanical lock due to a hydraulic fluid pressure failure or failure of the engine in flight.

The object of the invention is a propeller brake for a twin spool turbo-prop engine which permits the propeller to be stopped while the engine is running. Another object of the invention is a propeller brake which locks the propeller in a stationary position after it stops rotating. A further object of the invention is a propeller brake which locks the propeller in a stationary position when the engine is shut down. A still further object of the invention is a propeller brake which includes a safety latch preventing the propeller from being locked in a stationary position in the event of a hydraulic fluid pressure failure or engine failure in flight.

These and other advantages of the disclosed propeller brake will become apparent from the specification and the accompanying drawings.

DETAILED DESCRIPTION OF THE INVENTION

Figure 1:
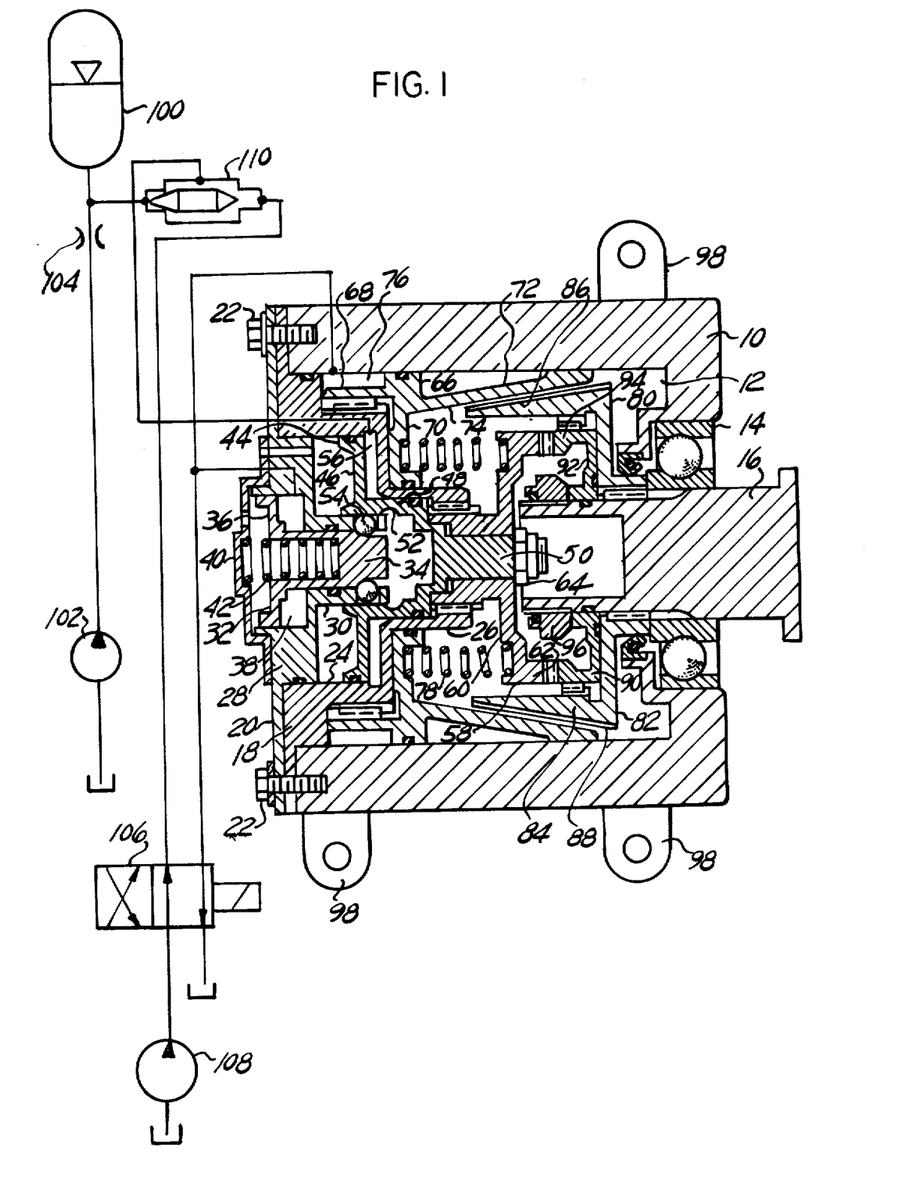
FIG. 1 is a cross-sectional view of the disclosed propeller brake showing the position of the elements with the engine shut down.
Figure 2:
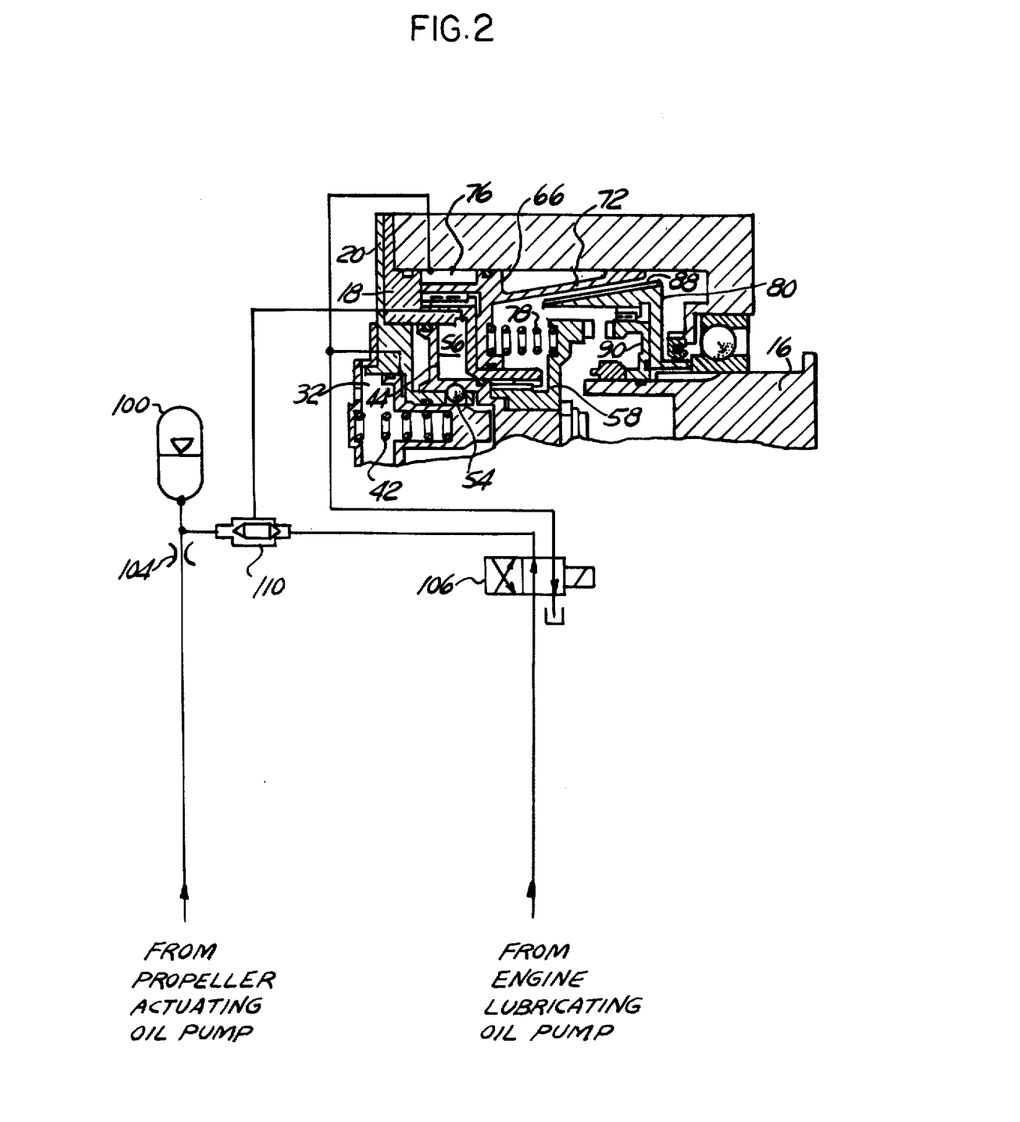
FIG. 2 is a partial cross-section of propeller brake showing the position of the elements with the aircraft in normal flight.
Figure 3:
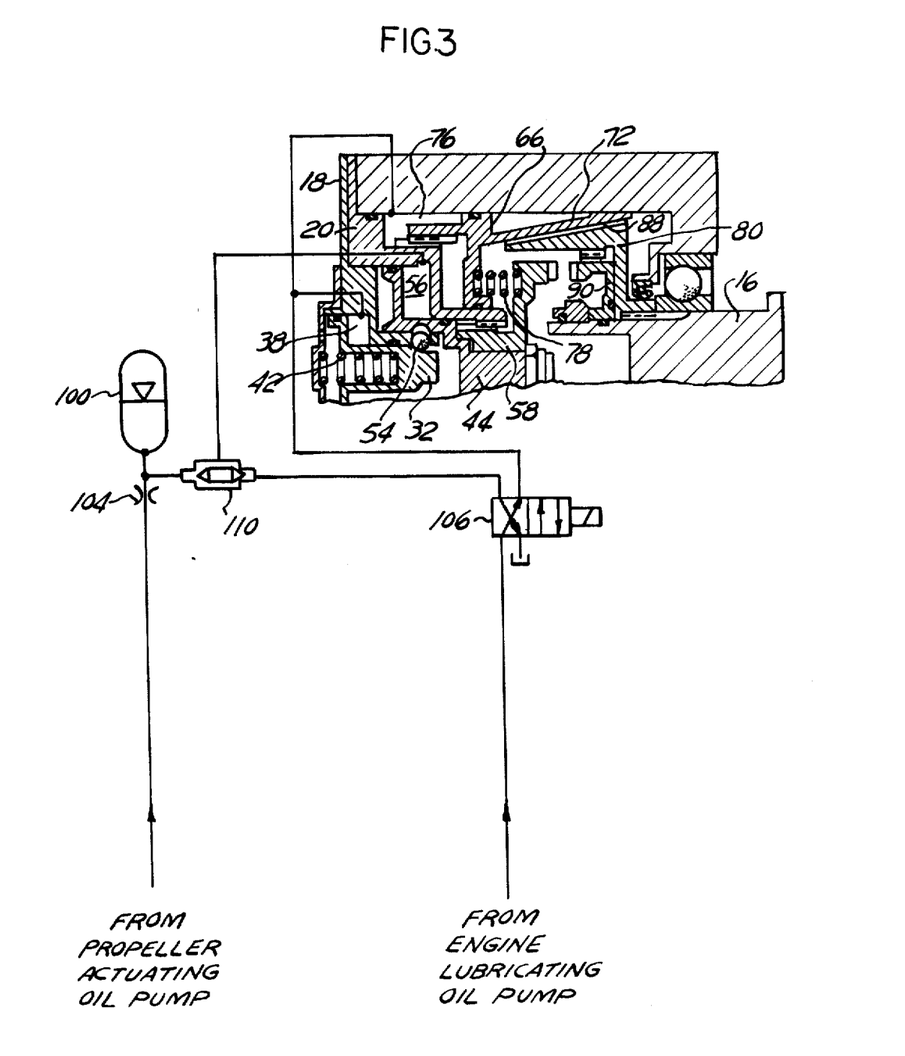
FIG. 3 is a partial cross-section of the propeller brake showing the position of the elements in response to a command to stop the propeller from rotating.
Figure 4:
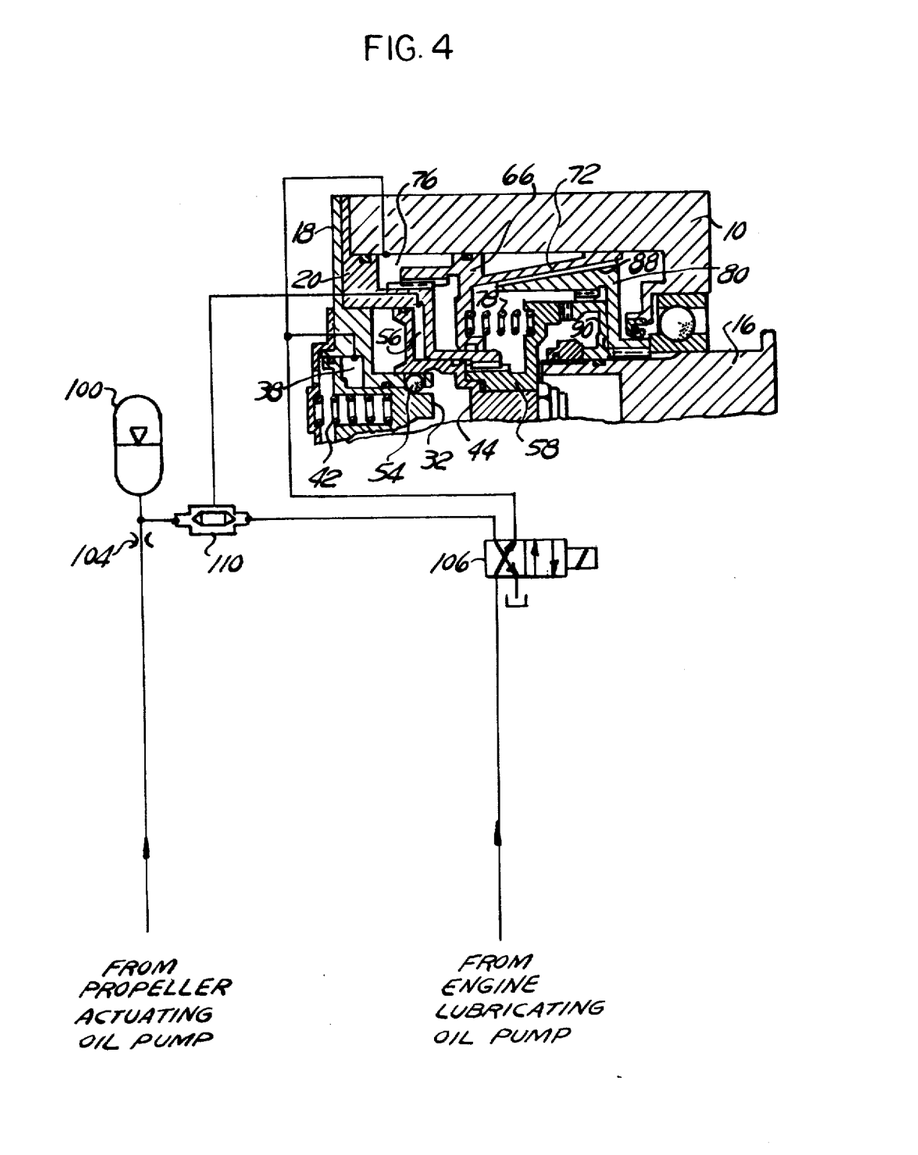
FIG. 4 is a partial cross-section of the propeller brake showing the position of the elements with the engine running and the propeller locked in a stationary position.

The propeller brake for a two spool type turbo-prop aircraft engine is illustrated in FIGS. 1 through 4. FIG. 1 shows the position of the propeller brake elements with the engine shut down. FIG. 2 shows the position of the elements during start-up and flying mode. FIGS. 3 and 4 show the positions of the elements in the braking and locked modes respectively.

Referring first to FIG. 1, the propeller brake comprises a housing 10 adapted to be mounted to the frame of the turbo-prop engine. The housing 10 has a generally cylindrical cavity 12 having a ball bearing 14 disposed at one end rotably supporting a shaft 16. The shaft 16 is rotably connected to the propeller shaft of the turbo-prop engine.

The opposite or open end of the cylindrical cavity is enclosed by a first guide member 18 and second guide member 20. The first and second guide members 18 and 20 respectively are secured to the end of the housing 10 by a plurality of bolts 22. The first guide member 18 has a pair of cylindrical bosses 24 and 26 protruding into the cavity. The first cylindrical boss 24 has an external spline and an internal guide bore. The second cylindrical boss 26 extends inwardly from the first cylindrical boss and has a smaller external diameter. The second cylindrical boss 26 has an external guide surface and an internal guide bore terminated with an internal spline. The first and second bosses are concentric with the axis of the housings cylindrical cavity 12.

The second guide member 20 also has a pair of cylindrical bosses 28 and 30 concentric with the bosses of the first guide member. The first boss 28 of the second guide member 20 has an external surface received in the guide bore of the first cylindrical boss 24 and an internal guide bore. The second cylindrical boss 30 extends from the end of the first boss 28. The second boss 30 has an external guide surface having a diameter smaller than the internal guide bore of first cylindrical member 28, and an internal guide bore.

A cylindrical safety latch pin 32 is slidably received in the internal guide bore of second cylindrical boss 30. The latch pin 32 has a tapered section 34 at one end and a radial flange 36 at the opposite end. The peripheral surface of the radial flange mates with the internal surface of first cylindrical boss 28 forming a first annular fluid chamber 38 between latch pin 32 and the second guide member 20. A spring retainer 40 is fixedly attached to the external surface of the second guide member 20. A resilient member such as spring 42 is disposed between the latch pin 32 and the spring retainer 40 produces a force urging the latch pin 32 inwardly.

A lock actuator 44 has a radial flange 46 disposed between the external surface of cylindrical boss 30 and the internal surface of cylindrical boss 24. The lock actuator member 44 also has a cylindrical extension 48 slidably received between the internal bore of cylindrical boss 26 and the external surface of cylindrical boss 30. A rod 50 threaded at its end extends inwardly from the end of the cylindrical extension 48. The cylindrical extension 48 also has a radial groove 52 formed circumferentially about its inner surface adapted to receive a plurality of balls 54. Each ball 54 is retained in an aperture formed through the cylindrical boss 30 of the second guide member 20. The balls 54 have a diameter greater than the thickness of the wall of cylindrical boss 30. A second annular fluid chamber 56 is formed between the radial flange 46 of lock actuator member 44 and the first guide member 18.

A first lock member 58 is received over the rod 50 of the lock actuator 44. The end of the first lock member 58 adjacent to the lock actuator 44 has a splined external surface mating with the internal splines of cylindrical boss 26. A radial flange 60 formed at the other end of the first lock member 58 supports an annular jaw coupling 62 having a plurality of radial teeth formed on the face thereof opposite said lock actuator 44. A nut 64 threaded onto the threaded end of the rod 50 locks the first lock member 58 to the lock actuator 44.

A non-rotatable brake member 66 of a friction brake assembly is slidably received in the housing's cylindrical cavity 12. The brake member 66 has a first cylindrical section 68 adjacent to the first guide member 18 having an internally splined bore mating with external splines of cylindrical boss 24, an inwardly extending radial flange 70 extending between the inner walls of the housing's cavity 12 and the external surface of cylindrical boss 26 and a brake drum 72 having an internal conical surface 74. A third annular fluid chamber 76 is defined by the inner surface of the housing cavity 12, the first guide member 18 and the radial flange 70 of the brake member 66. A set of springs, such as spring 78, equally spaced between the radial flange 70 of the brake member 66 and the radial flange 60 of the first lock member 58 produces a force urging these two elements axially away from each other.

The second part of the friction brake assembly comprises a rotating brake member 80 slidably received on the shaft 16. The brake member 80 has an internally splined bore mating with an externally splined portion of the shaft 16, and a radial flange 82 supporting a brake shoe 84. The brake shoe 84 has an external conical surface 86 and a bore having an internally splined section therein. A brake pad 88 made from a suitable friction material, such as that used on automotive or aircraft brakes, is bonded or otherwise attached to the conical surface 86 of the brake shoe 84 as shown.

The second lock member 90 is slidably received over the shaft 16 adjacent to brake member 80. The second lock member 90 has a radial flange 92 supporting a jaw coupling 94. The jaw coupling 94 has a set of radial teeth formed in the face thereof mating with the radial teeth formed in the face of jaw coupling 62, and an external spline mating with the external splines in the bore of the brake shoe 84. The second lock member 90 and rotating brake member 80 are secured to the shaft 16 between the inner race of ball bearing 14 and a nut 96 threaded onto the end of shaft 16.

The splined interconnections between the shaft 16, the rotating brake member 80, and the second lock member 90 cause them to rotate as a unit with the rotation of shaft 16. In a like manner, the splined interconnections between the first guide member 18, the lock member 58 and the brake member 66 makes these members non-rotatable with respect to the housing 10. The splined interconnection between these non-rotatable members permit them to be axially displaced relative to each other. Mounting tabs 98 attached to the housing 10 permit the propeller brake to be mounted to the frame of the engine.

The hydraulic circuit actuating the propeller brake comprises an accumulator 100 receiving fluid from a propeller actuating oil pump 102 through a fixed orifice 104, a two position, four way solenoid actuated reversing valve 106 and a shuttle valve 110. The solenoid reversing valve 106 has an input port receiving engine lubricating fluid from the engine's lubrication oil pump 108 and a drain port returning the propeller actuating fluid and engine lubricating fluid to a common fluid source. One input end of the shuttle valve 110 is connected to the junction between the accumulator 100 and the fixed orifice 104. The other input end of the shuttle valve 110 is connected to the port of the solenoid valve 106 opposite the input port receiving the engine lubricating fluid. The output of the shuttle valve 110 is connected to the fluid chamber 56 formed between the first guide member 18 and the lock actuator 44. The output of the solenoid valve opposite the drain port is connected to the fluid chamber 38 formed between the second guide member 20 and the lock pin 32 and the fluid chamber 76 formed between the inner surface of the housing cavity 12, the first guide member 18 and the radial flange 70, the non-rotating brake member 66.

Operation of the Propeller Brake

The relevant operating features of the two spool turbo-prop engine will be described first in order to provide a clearer understanding of the operation of the propeller brake. The turbo-prop engine comprises a jet engine, comparable the familiar jet engine in tandem with a turbine. The hot exhaust gases generated and expelled by the jet engine drive the turbine which rotates the propeller. The spool or drive shaft of the turbine is independent of the jet engine's shaft and the turbine's shaft may be stopped without adversely affecting the operation of the jet engine. The jet engine has an associated oil pump, supplying lubricating oil at a first pressure to the moving parts of the jet engine whenever it is operating. The turbine has an associated oil pump supplying propeller actuating oil, at a second pressure higher than the pressure of the lubricating oil when the propeller is turning. Both oil pumps have a common oil source.

Returning now to FIGS. 1 through 4 the operation of the propeller brake will be described during various modes of operation. FIG. 1 shows the position or state of the various elements within the propeller brake when the turbo-prop engine is shut down. In this state, the solenoid valve 106 is deactivated and the output pressures of the lubrication and propeller actuating oil pumps 108 and 102 respectively are effectively zero. Springs 78 urge the non-rotating brake member 66 away from the rotating brake member 80 disengaging the brake drum 72 from the brake shoe 84 and urges the first lock member 58 towards the second lock member 90 causing the mating radial teeth to engage. The engagement of the radial teeth of lock members 58 and 90 lock the shaft 16 with respect to the housing 10 and prevents the rotation or windmilling of the propeller when the engine is shut down.

Referring now to FIG. 2, the state or position of the propeller brake elements are shown when the jet engine is running and the solenoid valve 106 is in a deactivated state. This state represents the normal state of the propeller brake when the propeller is being actively driven, such as when the aircraft is taxiing or flying.

Starting of the jet engine activates the engine oil lubrication pump which outputs lubrication oil under pressure. The lubrication oil is communicated to the fluid chamber 56 between the lock actuator 44 and the first guide member 18 through the deactivated solenoid valve 106 and shuttle valve 110. The pressure of the lubrication oil applied to radial flange 46 produces a force, overcoming the force of springs 78, urging the lock actuator 44 and the connected non-rotating first lock member 58 away from second lock member 90. This disengages the mating radial teeth of the jaw type coupling unlocking shaft 16, permitting free rotation of the propeller by the turbine.

When the lock actuator 44 is fully retracted, the radial groove 52 is in registration with the balls 54. When this occurs, spring 42 urges the safety latch pin 32 towards the right displacing the fluid from the first fluid chamber 38 to the common drain through the deactivated solenoid valve. As the safety latch pin 32 moves to the right, the balls 54 are radially displaced by the tapered section 34 into the groove 52 locking the lock actuator 44 and first lock member 58 in the disengaged position. Spring 78 hold the conical brake drum 72 away from the brake shoe 84. The rotation of the propeller activates oil pump 102 to produce propeller activating fluid at the higher pressure which is now stored by accumulator 100. The propeller brake remains in this state as long as the jet engine is running and solenoid valve 106 is deactivated. The locking of the lock actuator 44 and first lock member 58 in the disengage position by the safety latch pin 32 is a fail safe feature of the propeller brake which prevents the engagement of the jaw type lock in event either engine lubricating oil or propeller activating oil pressures are lost during flight.

The braking mode of the propeller brake mechanism is illustrated in FIG. 3. The braking mode is initialed by placing the jet engine in an idle state then activating solenoid valve 106. Activation of solenoid valve 106 transmits engine lubricating oil to the first and third fluid chambers 38 and 76 respectively. The transmission of lubricating oil to chamber 38 produces a force overcoming the force of spring 42 and withdraws the safety latch pin 32. The balls 54 may now be displaced radially inward, unlocking the lock actuator 44.

Simultaneously, the transmission of the lubricating oil to fluid chamber 76 produces a force overcoming the force of springs 78 and urges the brake drum 72 into engagement with brake shoe 84 attached to rotating brake member 80 coupled to the propeller through shaft 16. The frictional engagement of the brake shoe 84 with the brake drum 72 absorbs the rotational energy of the propeller bringing it to a stop after a predetermined period of time.

The rotation of the propeller prior to coming to a stop during the initial portion of the braking period causes propeller actuating fluid to be supplied to fluid chamber 56 preventing the engagement of the non-rotating first lock member 58 with the rotating lock member 90. During the final stages of the braking procedure, propeller actuating oil continues to be supplied to fluid chamber 56 from accumulator 100 until the propeller comes to a complete stop. The decay rate of the propeller actuating oil pressure is controlled by fixed orifice 104. The size of fixed orifice 104 is selected such that the brake will bring the propeller to a complete stop before the pressure in the accumulator falls below a level sufficient to hold the lock actuator 44 in the unlocked position against the force of spring 78.

Referring now to FIG. 4, as the pressure in accumulator 100 falls below the level required to hold the lock actuator 44 in the unlocked position, the lock actuator 44 moves forward and the radial teeth on the face of non-rotating first lock member 58 engages the mating teeth on the face of the now stopped second lock member 90 locking shaft 16 and the propeller in a stationary position. The forward movement of the lock actuator 44 displaces balls 54 inwardly locking the safety latch pin 32 in its retracted position. In this state the shaft 16 and therefore the propeller are locked in a stationary position as long as the solenoid valve 106 remains energized. The engine may now be taken out of its idle state and run at any power level up to full or maximum power with no damage to either the propeller brake or the engine. With the engine running at full power, it can supply essential services to the aircraft thus dispensing with auxiliary power units.

Shutting down the engine and de-energizing solenoid valve 106 will return the propeller brake to the state shown in FIG. 1. De-energizing the solenoid valve 106 with the engine running will connect fluid chambers 38 and 76 to the low pressure common fluid drain and connect fluid chamber 56 back to the engine lubrication oil supply. The springs 78 will now produce a force displacing the oil from chamber 76 and retract brake member 66, disengaging brake drum 72 from brake shoe 84. Engine lubricating oil supplied to fluid chamber 56 will likewise retract lock actuator 44 against the force of springs 78 disengaging the teeth on the faces of lock member 58 and 90 unlocking shaft 16. The propeller is now free to be rotated by the turbine as previously discussed with reference to FIG. 2. When the brake actuator 44 reaches fully retracted position, the tapered portion of the safety latch pin 32 is urged forward by spring 42 and displaces balls 54 into the radial groove 52 locking the lock actuator 44 in the unlocked or disengaged portion.

Having disclosed the turbo-prop engine propeller brake with reference to a specific embodiment, it is recognized that a person skilled in the art may devise other hydro-mechanical or electromechanical mechanisms capable of performing the functions of the disclosed propeller brake without departing from the spirit of the invention. It is not intended that the invention be limited to the specific embodiment described and illustrated herein.

What is claimed is:

1. A propeller brake for a twin spool turbo-prop engine wherein the engine's propeller is independently driven by one of said twin spools, comprising:

a housing having an internal chamber and means for attaching said housing to the engine;

a shaft having one end adapted to be rotatably connected to the one spool driving the engine's propeller and the other end and supported for rotation relative to said housing disposed in said chamber;

means for generating a propeller signal in response to the rotation of the one spool;

means for generating an engine signal in response to the rotation of the other spool;

signal generator means for generating a first input signal in response to said engine signal and an external command to stop the rotation of the propeller and for generating a second input signal in response to either the simultaneous absence of said engine and propeller signals or to the absence of said propeller signal and an external command to stop the rotation of the propeller;

brake means disposed in said chamber for frictionally interconnecting said shaft and said housing in response to said first input signal to generate a force retarding the rotation of said shaft relative to said housing; and lock means disposed in said chamber for non-rotatably interconnecting said shaft and said housing in response to said second input signal to inhibit the rotation of said shaft relative to said housing.

2. The propeller brake of claim 1 wherein said brake means comprises:

a brake drum non-rotatably connected to the housing; said brake drum having a first brake surface concentric with said shaft;

a brake shoe connected to said shaft and rotating therewith, said brake shoe having a second brake surface mating with said first brake surface; and first displacement means for axially engaging said brake drum and said brake shoe in response to said first input signal generating said frictional force.

3. The propeller brake of claim 2 wherein said first brake surface and second brake surface are mating conical surfaces.

4. The propeller brake of claims 2 or 3 wherein said brake means further includes a friction material pad attached to one of said first and second brake surfaces.

5. The propeller brake of claim 2 wherein said lock means comprises:

a first lock member non-rotatably connected to said housing said first lock member having a first part of a face type jaw coupling disposed in one face thereof;

a second lock member connected to said shaft and rotating therewith, said second lock member having the mating part of said face type jaw coupling disposed on a face thereof adjacent to said first part of the face type jaw coupling; and second displacement means for engaging said first and second lock members in response to said second input signal to inhibit the rotation of said shaft relative to said housing.

6. The propeller brake of claim 5 wherein said propeller brake includes a first fluid pump driven by the other spool of the engine to provide a first fluid at a first pressure and a second fluid pump driven by the one spool of the engine for providing a second fluid at a second pressure, said means for generating a propeller signal is said second fluid pump and said means for generating an engine signal is said first fluid pump; and wherein said signal generator means comprises:

accumulator means for temporarily storing a fluid pressure indicative of the second pressures to generate said second input signal as a pressure stored in said accumulator below a predetermined value;

two position solenoid valve means having a first port connected to said first fluid pump and receiving said first fluid, a second port connected to an unpressurized fluid source, third port and a fourth port, said solenoid valve having an unenergized state interconnecting said first port to said third port and said second port to said fourth port and an energized state in response to said external command to stop the propeller interconnecting said first port to said fourth port and said second port to said third port to generate said first input signal at said fourth port indicative of said first fluid at said first pressure, and a shuttle valve having a first inlet connected to said accumulator, a second inlet connected to the third port of said solenoid valve and an outlet.

7. The propeller brake of claim 6 wherein said accumulator means comprises:

an accumulator for storing the pressure of said second fluid; and a fixed orifice disposed between said second fluid pump and said accumulator controlling the rate at which said second fluid flows to and from said accumulator, said accumulator and fixed orifice combining to form a hydraulic delay circuit holding the pressure of said second fluid stored in said accumulator above said predetermined value for a time sufficient for the brake means to bring the propeller to a complete stop before said pressure falls below said predetermined pressure generating said second input signal.

8. The propeller brake of claim 6 wherein the turbo prop engine includes a propeller actuator fluid pump connected to the one spool to provide propeller actuator fluid when the propeller is rotating and a engine lubricating fluid pump connected to the other spool to provide engine lubricating fluid when the engine is running, said first fluid pump is said engine lubricating fluid pump and said first fluid is said lubricating fluid and said second fluid pump is said propeller actuator fluid pump and said second fluid is said propeller actuator fluid.

9. The propeller brake of claim 5 wherein said first displacement means comprises:

first resilient biasing means for producing a force urging said brake drum away from said rotating brake shoe to disengage said first brake surface from said second brake surface; and first hydraulic actuator means having a movable member connected to said brake drum for producing a force in response to said first input signal, said force axially displacing said brake drum towards said rotating brake shoe against the force of said first resilient biasing means to engage said first brake surface with said second brake surface and to generate said frictional force retarding the rotation of said shaft relative to said housing; and wherein said second displacement means comprises:

second resilient biasing means for producing a force urging said first lock member towards said second lock member to engage said mating parts of the face type jaw coupling and inhibit the rotation of said shaft relative to said housing; and second hydraulic actuator means having a movable member attached to said first lock member for producing a force in the absence of said second input signal disengaging said mating parts of the face type jaw coupling.

10. The propeller brake of claim 9 wherein said first and second resilient biasing means is at least one spring disposed between said brake drum and said first lock member.

11. The propeller brake of claim 7 wherein said internal chamber of said housing is a cylinder concentric with said shaft and having its end opposite said shaft enclosed, said first displacement means comprises:

a first cylindrical guide extending into said chamber from said opposite end concentric with said shaft and forming an annular first fluid chamber defined by the internal walls of said chamber and the external surface of said first cylindrical guide;

a first annular piston, connected to said brake drum, slidably disposed in said first fluid chamber;

a first fluid input port interconnecting said first fluid chamber with the fourth port of said solenoid valve; and first resilient biasing means producing a force urging said first piston and the connected brake drum away from said rotating brake member.

12. The propeller brake of claim 11 wherein said second displacement means comprises:

a second cylindrical guide extending into said chamber from said opposite end and concentric with said shaft, said second guide member having an external diameter smaller than the internal diameter of said first guide member;

a flange extending radially from the internal end of said first guide member toward said second guide member and partially enclosing the space therebetween to form an annular cavity bounded by said first and second guide members, the opposite end of said chamber and said flange;

a second annular piston slidably disposed in said annular cavity, said second annular piston having a cylindrical extension connecting it to said first lock member and forming a second fluid chamber bounded by said first guide member, the radial flange, and the second annular piston and its cylindrical extension;

a second fluid input port interconnecting said second fluid chamber with the output of said shuttle valve; and second resilient biasing means producing a force urging said second piston means and said first lock member towards said second lock member.

13. The propeller brake of claim 12 wherein said first and second resilient biasing means are a plurality of equally spaced springs compressively disposed between said first piston and said first lock member.

14. The propeller brake of claim 1 further including safety latch means having a normally latched state in response to the absence of said first and second input signals for preventing said lock means from inhibiting the rotation of the propeller relative to said housing, and an unlatch state in response to said first input signal enabling said lock means to engage in response to said second input signal and inhibit the rotation of said propeller.

15. The propeller brake of claim 7 further including safety latch means having a latched state in response to the absence of said first and second input signals for preventing said second displacement means from engaging said first and second lock members and having an unlatched state in response to said first input signal enabling said second means for displacing to engage said first and second lock members in response to said second input signal.

16. The propeller brake of claim 12 further including a safety latch means having a latched state in response to the absence of said first and second input signals locking said second annular piston in a position with said first and second lock members disengaged, and an unlatched state in response to said first input signal unlocking said second annular piston permitting said first and second lock member to be engaged by said second resilient biasing means in response to said second input signal.

17. The propeller brake of claim 16 wherein said safety latch means comprises:

a plurality of apertures radially formed through said second cylindrical guide proximate its internal end, the diameter of said apertures being larger than thickness of the wall of said second cylindrical guide;

a plurality of balls, one rotatably received in each of said apertures;

an annular groove formed on the internal surface of the cylindrical extension of said second annular piston in registration with said balls when said second annular piston is in a position disengaging said first and second lock members;

a latch pin slidably disposed inside said second cylindrical guide having a central section mating with the internal surface of said second cylindrical guide, a tapered down section at its internal end and a third annular piston at the other end, said tapered down section having a diameter sufficiently small to permit the balls to be radially displaced inwardly so that their external surfaces do not extend above the external surface of the second cylindrical guide;

resilient means for producing a force urging said latch pin to a first position with said central section urging said balls radially outwardly into the annular groove formed in the cylindrical extension of the second annual piston locking it in place;

a third fluid chamber formed in said second cylindrical guide receiving the third annular piston;

and a fluid port interconnecting said third fluid chamber with the fourth port of said solenoid valve;

wherein said second input signal produces a force on said third annular piston displacing said latch pin in a direction placing the tapered down section of said latch pin coincident with said balls permitting said balls to move inwardly unlatching said second annular piston.

18. A propeller brake for a twin spool turbo-prop engine having the propeller independently driven from one of said twin spools, a propeller actuating pump providing actuator fluid at a first pressure when the propeller is turning and an engine lubrication pump providing lubrication fluid at a second pressure when the engine is running, comprising:

- a housing having an internal chamber and means for fixedly attaching said housing to the engine;
- a shaft having one end adapted to be rotatably connected to the one spool, the other end disposed in said internal chamber, and supported for rotation relative to said housing;
- a brake drum means disposed in said internal chamber, non-rotatable with respect to said housing and axially displaceable in a direction parallel to the axis of said shaft;
- brake shoe means disposed in said internal chamber fixedly attached to said shaft and rotating therewith;
- first means for engaging said brake drum means with said brake shoe means in response to a first input signal to generate a frictional force retarding the rotation of said shaft with respect to said housing;
- first lock member means disposed in said internal chamber, non-rotatable with respect to said housing and axially displaceable in a direction parallel to the axis of said shaft;
- second lock member means disposed in said housing, fixedly attached to said shaft and rotating therewith;
- second means for engaging said first lock means with said second lock means in response to the absence of a second input signal to inhibit the rotation of said shaft relative to said housing;
- signal generator means for generating said first and second input signal in response to the pressure of said actuator and lubrication fluids and an external command to stop said propeller from rotating, said signal generator means generating said first input signal in response to the lubrication fluid having said second pressure indicating the engine running and an external command to stop the propeller from turning and generating said second input signal when the pressure of the propeller actuator fluid is above a predetermined pressure and when the pressure of the lubricating fluid is above said same predetermined pressure in the absence of a command to stop the propeller from rotating.

19. The propeller brake of claim 18 wherein said brake drum means has a conical first braking surface and said brake shoe means has a mating conical second braking surface.

20. The propeller brake of claim 19 wherein one of said first and second braking surfaces further includes a friction material brake pad disposed thereover.

21. The propeller brake of claim 19 wherein said first means includes:
- a resilient member producing a resilient force disengaging said brake drum means from said brake shoe means; and
- a hydraulic actuator having a piston attached to said brake drum means, said piston producing a force in response to said first signal urging said brake drum means to engage said brake shoe means against said resilient force and generate said frictional force.

22. The propeller brake of claim 18 wherein said first lock member means includes a first part of a face type jaw coupling and said second lock member means includes a mating second part of the same face type jaw coupling.

23. The propeller brake of claim 21 wherein said second means further includes said resilient member, said resilient member further producing a resilient force urging said first lock member to engage said second lock member; and
- a second hydraulic actuator having a piston attached to said first lock member for producing a force in response to said second input signal, said force disengaging said first lock member from said second lock member unlocking the rotation of said shaft relative to said housing.

24. The propeller brake of claim 18 further including safety latch means for disabling said second means in response to the occurrence of said second input signal in the absence of said first input signal and enabling said second means in response to receiving said first input signal.

25. The propeller brake of claim 23 further including safety latch means for locking the piston of said second hydraulic actuator in the position with said first lock member disengaged from said second lock member in response to the occurrence of said second input signal in the absence of said first input signal and for unlocking the piston of said second hydraulic actuator in response to receiving said first input signal.

26. The propeller brake of claim 18 wherein said signal generator means comprises:
- accumulator means for storing a fluid pressure;
- a fixed orifice interconnecting said accumulator means with the output of the propeller actuator pump;
- a two position solenoid valve having first port connected to the output of the engine lubricating pump, a second input port connected to an unpressurized fluid source, a third, and a fourth port, said solenoid valve having an unenergized state interconnecting said first port with said third port and said second port with said fourth port, and an energized state in response to said external command interconnecting said first port with said fourth port and said second port with said third port; and
- a shuttle valve having a first inlet connected to said accumulator means, a second inlet connected to the third port of said solenoid valve, and an outlet;
- wherein said first input signal is generated at the fourth port of said solenoid valve when said solenoid valve is energized and said second signal is generated at the outlet of said shuttle valve in response to said actuator fluid having a pressure exceeding said predetermined value and alternatively in response to said lubrication fluid having a pressure exceeding said predetermined value when said solenoid valve is in said unenergized state.

* * * * *